United States Patent
Sano et al.

(10) Patent No.: US 8,696,216 B2
(45) Date of Patent: Apr. 15, 2014

(54) OPTICAL MODULE, METHOD OF PRODUCING OPTICAL MODULE, OPTICAL TRANSMISSION MODULE, AND ELECTRONIC APPARATUS

(75) Inventors: Akihiko Sano, Kyoto (JP); Hiroto Nozawa, Kyoto (JP); Toshiaki Okuno, Kyoto (JP); Junichi Tanaka, Kyoto (JP); Naru Yasuda, Kyoto (JP); Hayami Hosokawa, Kyoto (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 1561 days.

(21) Appl. No.: 12/296,495

(22) PCT Filed: Apr. 12, 2007

(86) PCT No.: PCT/JP2007/058054
§ 371 (c)(1),
(2), (4) Date: Oct. 8, 2008

(87) PCT Pub. No.: WO2007/119778
PCT Pub. Date: Oct. 25, 2007

(65) Prior Publication Data
US 2009/0274412 A1    Nov. 5, 2009

(30) Foreign Application Priority Data
Apr. 14, 2006    (JP) .................. 2006-112775

(51) Int. Cl.
*G02B 6/36*    (2006.01)
(52) U.S. Cl.
USPC .................. 385/88; 385/92; 385/94
(58) Field of Classification Search
USPC ............. 385/88, 92, 94; 438/27, 65; 257/98, 257/432, 492; 250/227.11
See application file for complete search history.

(56) References Cited

U.S. PATENT DOCUMENTS

| | | | |
|---|---|---|---|
| 6,623,178 B1 * | 9/2003 | Sakurai et al. | 385/92 |
| 6,733,190 B2 * | 5/2004 | Kuhara et al. | 385/94 |
| 2001/0000316 A1 | 4/2001 | Kawai | |
| 2005/0002618 A1 | 1/2005 | Miyamae et al. | |

FOREIGN PATENT DOCUMENTS

| | | |
|---|---|---|
| JP | 5-32804 Y2 | 8/1993 |
| JP | 2000-9968 A | 1/2000 |
| JP | 2000-214351 A | 8/2000 |
| JP | 2004-133117 A | 4/2004 |
| JP | 2005-62645 A | 3/2005 |

OTHER PUBLICATIONS

International Search Report w/translation from PCT/JP2007/058054 dated May 15, 2007 (3 pages).

(Continued)

*Primary Examiner* — Kevin S Wood
(74) *Attorney, Agent, or Firm* — Osha Liang LLP

(57) ABSTRACT

An optical module has a support board, an optical transmission path, and at least a single optical element having a light receiving function or a light emitting function provided on the support board. A light emission surface of the optical transmission path or a light incidence surface of the optical transmission path is arranged such that the optical element and the optical transmission path are optically coupled to each other, with respect to a light receiving surface or a light emitting surface of the optical element. The optical element is sealed by a sealing agent. A gap is provided between the optical transmission path and the surface of the sealing agent on the light receiving surface or the light emitting surface of the optical element.

19 Claims, 18 Drawing Sheets

(56) References Cited

OTHER PUBLICATIONS

Patent Abstract of Japan; Publication No. 2000-009968 dated Jan. 14, 2000; Matsushita Electric Ind. Co. Ltd. (9 pages).
Patent Abstracts of Japan; Publication No. 2000-214351 dated Aug. 4, 2000; Nippon Telegraph & Telephone Corp. (NTT) (7 pages).
Patent Abstracts of Japan; Publication No. 2004-133117 dated Apr. 30, 2004; Mitsubishi Electric Corp. (9 pages).
Patent Abstracts of Japan; Publication No. 2005-062645 dated Mar. 10, 2005; Toppan Printing Co. Ltd. (11 pages).
Office Action for Korean Application No. 10-2008-7019175 mailed on Apr. 29, 2010 and English translation thereof, 10 pages.

* cited by examiner

PRIOR ART

PRIOR ART

OPTICAL MODULE, METHOD OF PRODUCING OPTICAL MODULE, OPTICAL TRANSMISSION MODULE, AND ELECTRONIC APPARATUS

TECHNICAL FIELD

The present invention relates to an optical module for optical data transmission and, more particularly, relates to an optical transmission module including a flexible optical transmission path and a method for producing the same.

BACKGROUND ART

In recent years, there have been extended optical communication networks capable of high-speed and large-capacity data communication. Such optical communication networks are expected to be mounted on commercial apparatuses, in the future. Therefore, there has been a need for optical data transmission cables (optical cables) for electrical inputting and outputting which are usable in the same ways as those of existing electric cables, as applications for realizing high-speed and large-capacity data transmission, countermeasures against noises and data transmission among boards in apparatuses. It is desirable that film optical waveguides are employed as such optical cables, in consideration of flexibility.

An optical waveguide is constituted by a core with a higher refractive index and a cladding with a lower refractive index which is provided around the core in contact with the core and is adapted to propagate optical signals incident to the core while causing total internal reflection thereof at the interface between the core and the cladding. Further, a film optical waveguide has flexibility, since the core and the cladding therein are made of flexible polymeric materials.

In cases where such a film optical waveguide with flexibility is employed as an optical cable, it is necessary that the film optical waveguide is aligned with and optically coupled to a photoelectric conversion device (an optical element). Such an optical element is for converting electric signals into optical signals and emitting them or for receiving optical signals and converting them into electric signals, and such an optical element can be a light emitting device in the light inputting side or a light receiving device in the light outputting side. The alignment thereof should be performed with high accuracy, since it affects the optical coupling efficiency.

FIG. 21 illustrates an exemplary structure where a film optical waveguide and an optical element are aligned with and optically coupled to each other in an optical module.

The optical module 100 illustrated in FIG. 21 is constituted to include an optical waveguide 101, an optical element 102 and a support board 103, at its optical-incidence side or optical-emission side end portion. The optical waveguide 101 is secured near its end portion to the support board 103 through adhesion or the like, in a state where the positional relationship between the end portion of the optical waveguide 101 and the optical element 102 is fixed.

The support board 103 has a step which causes its surface on which the optical element 102 is mounted and its surface to which the optical waveguide 101 is secured (adhered) to be different surfaces. Further, the end surface of the optical waveguide 101 is not perpendicular to the optical axis (the center axis along the longitudinal direction of the core) and is obliquely cut to form an optical-path changeover mirror. Accordingly, signal light which has been transmitted through the core portion of the optical waveguide 101 is reflected by the optical-path changeover mirror to change the direction of its proceeding and, then, is emitted toward the optical element 102.

In the aforementioned structure in FIG. 21, a gap is induced between the lower surface of the optical waveguide 101 and the upper surface of the optical element 102. Further, on the side of light emission from the optical waveguide 101, as illustrated in FIG. 22, the emitted light which is emitted from the end portion of the optical waveguide 101 toward the light receiving device 102 becomes diffused light, not parallel light. Accordingly, if there is a gap between the lower surface of the optical waveguide 101 and the upper surface of the optical element 102, this will induce light deviated from the light receiving surface of the light receiving device 102, thereby resulting in an optical loss. Further, although not illustrated, on the side of light incidence to the optical waveguide 101, the incident light from the light emitting device 102 is diffused, which increases the quantity of light which can not be coupled to the core portion of the optical waveguide 101, thereby resulting in an optical loss.

As methods for suppressing such optical losses, there are a method which positions the optical element and the optical waveguide such that the distance therebetween is made smaller, a method for condensing light with an optical component such as a lens or a prism, and the like. However, the former method has a large influence caused by the variation of mounting and the difficulty in securing a space for bonding wiring for the optical element. Further, the latter method has an increase in the number of components.

Further, Patent Documents 1 and 2 disclose structures for embedding a resin with a high refractive index in the gap between a light emitting device and an optical waveguide for adhering and securing the optical waveguide with the resin. This structure can suppress the undesirable reflection at the interface with the aforementioned resin layer, thereby increasing the optical coupling efficiency. Further, the structure for embedding a resin with a higher refractive index in the gap between the optical element and the optical waveguide can also reduce the light diffusion between the light emitting device and the optical waveguide, and this effect is expected to increase the optical coupling efficiency.

Patent Document 1: Japanese Patent Unexamined Publication "JP-A No. 2000-214351 (date of publication: Aug. 4, 2000)"

Patent Document 2: Japanese Patent Unexamined Publication "JP-A No. 2000-9968 (date of publication: Jan. 14, 2000)"

DISCLOSURE OF THE INVENTION

However, with the aforementioned structures in the Patent Documents 1 and 2, there is difficulty in aligning the optical element and the optical waveguide with respect to each other with high accuracy, due to the wettability and the curing contraction of the resin embedded in the gap between the light emitting device and the optical waveguide.

Namely, as illustrated in FIG. 23, in cases where the surface of the optical waveguide 101 which is faced to the optical element 102 contacts with the embedded resin 104, the position of the optical waveguide 101 is changed due to the curing contraction of the resin 104 during curing it, which adversely affects the accuracy of alignment with the optical element 102. Particularly, in cases where the optical waveguide 101 is a film optical waveguide with high flexibility, the aforementioned problem is prominently induced.

An optical module according to one or more embodiments of the present invention enables alignment of an optical waveguide and an optical element with respect to each other with high accuracy and also enables suppressing the optical loss at the optical coupling of the optical waveguide and the optical element to each other.

As described above, an optical module according to one or more embodiments of the present invention is an optical module including a support board, an optical transmission path and at least a single optical element having a light receiving function or a light emitting function provided on the support board, wherein a light emission surface of the aforementioned optical transmission path or a light incidence surface of the optical transmission path is placed at such a position as to cause the aforementioned optical element and the aforementioned optical transmission path to be optically coupled to each other, with respect to a light receiving surface or a light emitting surface of the aforementioned optical element, and the aforementioned optical element is sealed by a sealing agent, and a gap is provided between the aforementioned optical transmission path and the surface of the aforementioned sealing agent on the light receiving surface or the light emitting surface of the aforementioned optical element.

Further, a method for producing an optical module according to one or more embodiments of the present invention is a method for producing an optical module including a support board, an optical transmission path and at least a single optical element having a light receiving function or a light emitting function provided on the support board, which includes a first step for mounting the optical element on the aforementioned support board, applying a sealing agent thereto to have a predetermined thickness thereon and then curing it, and a second step for adhering and securing the optical transmission path to the support board, wherein the aforementioned optical transmission path includes an optical-path changeover mirror, a light emission surface of the aforementioned optical transmission path or a light incidence surface of the optical transmission path is placed at such a position as to cause the aforementioned optical element and the aforementioned optical transmission path to be optically coupled to each other, with respect to a light receiving surface or the light emitting surface of the aforementioned optical element and, in the second step, the thickness of the aforementioned sealing agent is set to be a thickness which provides a gap between the aforementioned optical transmission path and the surface of the aforementioned sealing agent on the light receiving surface or the light emitting surface of the aforementioned optical element.

With the aforementioned structure, the sealing agent can be embedded in most of the gap between the optical transmission path and the optical element. This can reduce the diffusion of light between the optical transmission path and the optical element and, this effect can increase the optical coupling efficiency.

Further, since a gap is provided between the emission surface or the incidence surface of the optical transmission path and the surface of the sealing agent on the light receiving surface or the light emitting surface of the optical element, the surface of the optical transmission path which is faced to the optical element does not contact with the sealing agent. This prevents the curing contraction of the sealing agent from affecting the optical transmission path. This can realize excellent alignment accuracy in adhering and securing the optical transmission path to the support board.

Further, the aforementioned optical element means a light emitting device on the side of light incidence to the optical transmission path or a light receiving device on the side of light emission from the optical transmission path.

BEST MODE FOR CARRYING OUT THE INVENTION

Hereinafter, an embodiment of the present invention will be described with reference to the drawings. At first, an exemplary structure of an optical module according to the present embodiment will be described, with reference to FIG. 1.

Figure 1:
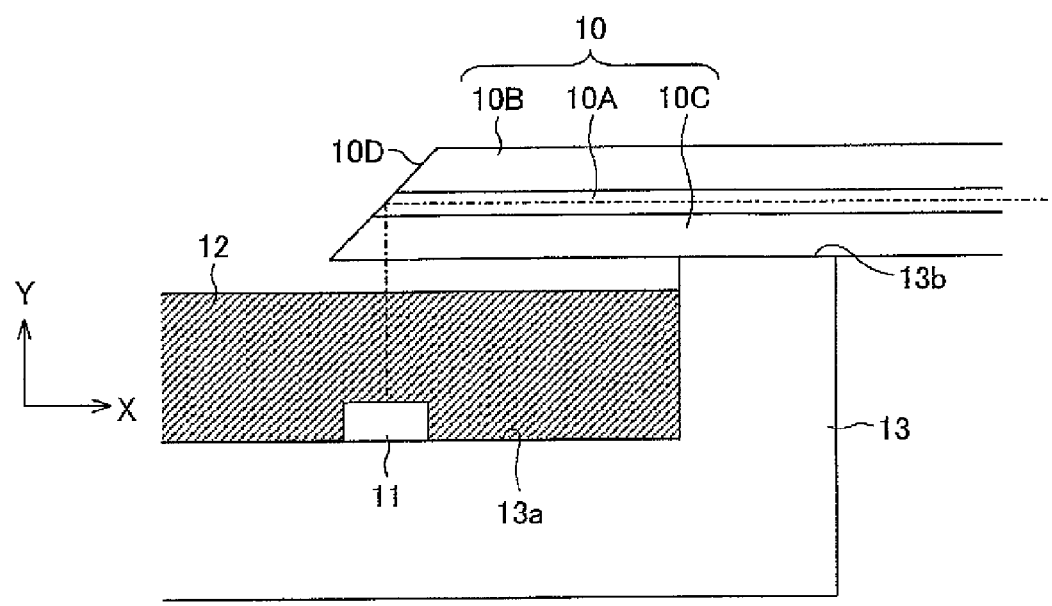
FIG. 1 is a cross-sectional view illustrating the structure of main parts of an optical module, illustrating an embodiment of the present invention.

The optical module 1 illustrated in FIG. 1 is structured to include an optical transmission path 10, an optical element 11, a sealing agent 12 and a support board 13, in general, near an end portion thereof. Further, in the following description, an optical waveguide 10 is employed as the optical transmission path, and a sealing resin 12 is employed as the sealing agent. The optical waveguide 10 is secured at its end portion to the support board 13 through adhesion or the like, in a state where the relative positional relationship between the end portion of the optical waveguide 10 and the optical element 11 is fixed. The optical module 1 may further include electric wirings and electric connection portions for facilitating extraction of electric signals outputted from the optical element 11. Further, the optical element 11 is a light emitting device (an optical element having a light emitting function) such as a laser diode at an end portion for light incidence to the optical waveguide 10, while the optical element 11 is a light receiving device (an optical element having a light receiving function) such as a photodiode at an end portion for emitting light from the optical waveguide 10.

At first, the optical waveguide 10 is constituted by a core portion 10A, an upper cladding layer 10B and a lower cladding layer 10C. Namely, the optical waveguide 10 has a laminated-layer structure constituted by the upper cladding layer 10B, the lower cladding layer 10C and the core portion 10A sandwiched therebetween. Optical signals being transmitted through the optical waveguide 10 proceed within the core portion 10A while being reflected by the interface between the core portion 10A and the upper cladding layer 10B and the interface between the core portion 10A and the lower cladding layer 10C. Further, in FIG. 1, it is assumed that the longitudinal direction (the direction of the optical axis) of the optical waveguide 10 is the direction of an X axis, while the direction of the lamination of the core portion 10A, the upper cladding layer 10B and the lower cladding layer 10C is the direction of a Y axis. Further, the direction of the Y axis is coincident with the direction of the normal to the surface of the support board 13 on which the optical element 11 is mounted.

The end surface of the optical waveguide 10 is not perpendicular to the optical axis (the X axis) and is obliquely cut to form an optical-path changeover mirror 10D. More specifically, the end surface of the optical waveguide 10 is inclined such that it is perpendicular to the XY plane and forms an angle θ (θ<90°) with respect to the X axis.

Accordingly, in the light-emission side of the optical waveguide 10, signal light which has been transmitted through the core portion 10 is reflected by the optical-path changeover mirror 10D to change the direction of its proceeding and, then, is emitted from the emission surface of the optical-path changeover mirror 10D toward the light receiving device 11. Further, on the light-incidence side of the optical waveguide 10, signals emitted from the light emitting device 11 enter the incidence surface of the optical-path changeover mirror 10D and, thereafter, are reflected by the optical-path changeover mirror 10D to change the direction of their proceeding and then are transmitted through the core portion 10. In this case, the light-emission surface (or the incidence surface) of the optical waveguide 10 exists on the outer surface of the lower cladding layer 10C (or the upper cladding layer 10B) since there is provided the optical-path changeover mirror 10D, while the light receiving surface (or the light emitting surface) of the optical element 11 is placed such that it is faced to the light emission surface (or the incidence surface) of the optical waveguide 10.

Further, the angle of inclination θ of the optical-path changeover mirror 10D is usually set to 45°, in order to facilitate alignment of the optical-path changeover mirror 10D and the optical element 11 with each other. Further, the optical-path changeover mirror can be formed by externally mounting a mirror portion to the end portion of the optical waveguide 10.

One of the functions of the sealing resin 12 is sealing the optical element 11 for protecting the optical element 11 against dusts and humidity, thereby increasing the liability of the optical module 1. Another important function of the sealing resin 12 is preventing the diffusion of optical signals being transmitted between the optical waveguide 10 and the optical element 11 for suppressing the optical loss due to the diffusion of optical signals. Therefore, as the sealing resin 12, it is possible to preferably employ an epoxy-based, acrylic-based, silicon-based, urethane-based transparent resin or the like.

It should be noted that, in the optical module 1, the gap between the optical waveguide 10 and the optical element 11 is not entirely filled with the sealing resin 12, and an interstice is provided between the sealing resin 12 and the optical waveguide 10. Namely, there is provided an interstice between the surface of the sealing resin 12 on the light receiving surface or the light emitting surface of the optical element 11 and the emission surface or the incidence surface of the optical waveguide 10.

As procedures for fabricating the optical module 1 with the structure illustrated in FIG. 1, at first, the optical element 11 is mounted on the surface 13a of the support board 13, then the sealing resin 12 is applied thereon to have a predetermined thickness and, then, it is cured. Thereafter, the optical waveguide 10 is adhered and secured to the surface 13b of the support board 13.

The optical module 1 with the aforementioned structure is structured, such that the surface of the optical waveguide 10 which is faced to the optical element 11 does not contact with the sealing resin 12, which prevents the curing contraction of the sealing resin 12 from affecting the optical waveguide 10. This can realize excellent alignment accuracy in adhering and securing the optical waveguide 10 to the support board 13.

Further, the sealing resin 12 can be embedded in most of the gap between the optical waveguide 10 and the optical element 11. This can reduce the diffusion of light between the optical waveguide 10 and the optical element 11 and, this effect can increase the optical coupling efficiency.

Further, preferably, the interstice provided between the sealing resin 12 and the optical waveguide 10 is formed to have a smallest possible width (a width in the direction of the Y axis) enough to prevent the optical waveguide 10 and the sealing resin 12 from coming into contact with each other. It is preferable to set the width of the interstice provided between the sealing resin 12 and the optical waveguide 10 within the range of 5 to 50 µm, in consideration of the current fabrication accuracy.

Figure 2:
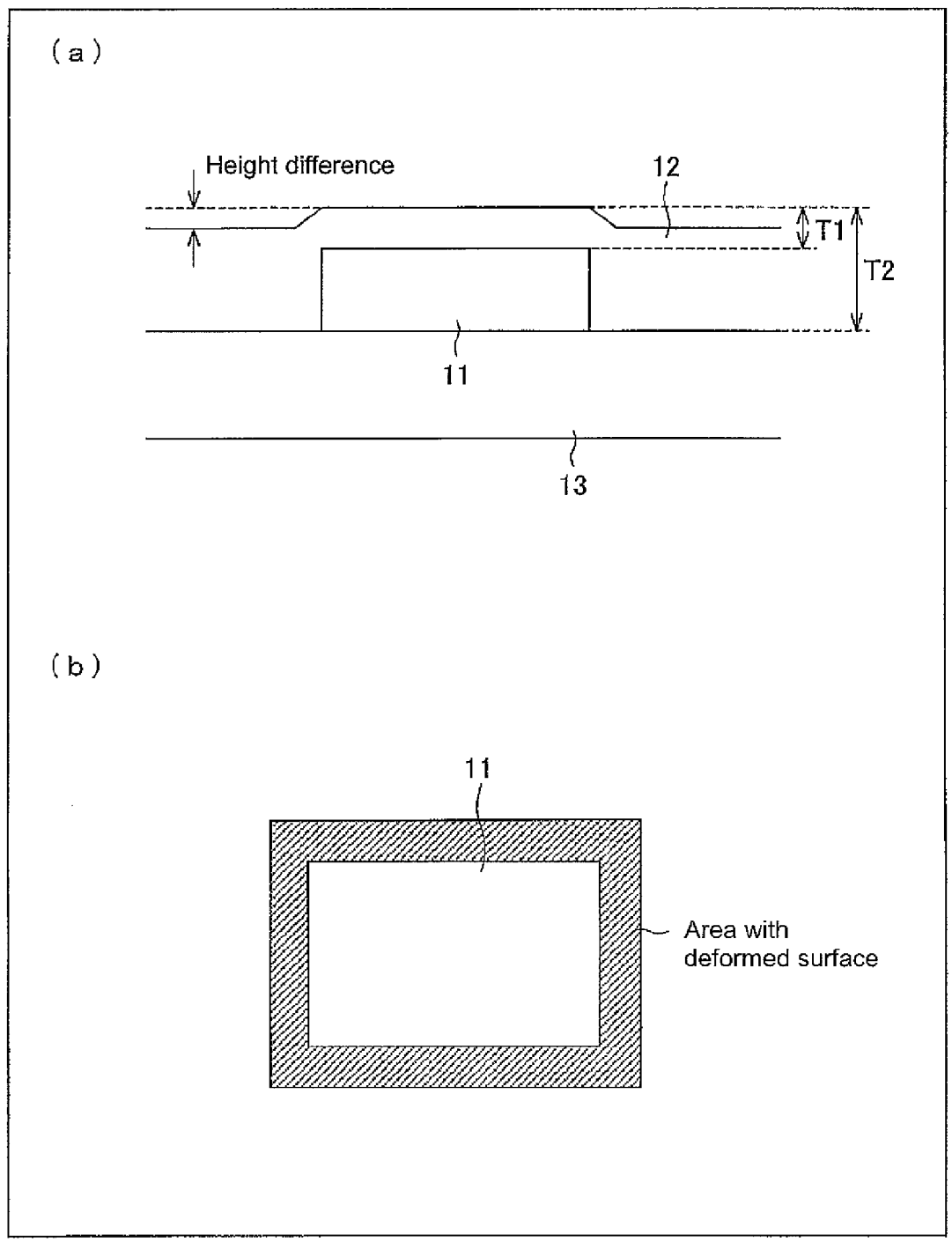
FIG. 2 is a view illustrating a concavity and a convexity generated on a sealing resin in the aforementioned optical module, with (a) illustrating a cross-sectional view and (b) illustrating an upper view.

In the aforementioned optical module 1, when the sealing resin 12 on the optical element 11 is cured, a height difference (a concavity and a convexity) as illustrated in FIGS. 2(*a*) and (*b*) is generated on the surface thereof, due to the curing contraction of the sealing resin 12. Namely, in the area over which the optical element 11 exists, the sealing resin 12 has a different layer thickness from that in the area over which the optical element 11 does not exist, which generates a concavity and a convexity as described above due to the difference in the amount of contraction of the sealing resin 12. More specifically, in the case where the optical element 11 had a thickness of 150 µm and the sealing resin 12 had a layer thickness of 200 µm, there was generated an area having a height difference (designated by hatching by diagonal lines in FIG. 2(*b*)) due to the deformation of the surface, around the optical element 11. Further, the area having such a height difference had a width of about 30 µm.

The surface of the sealing resin 12 serves as a light incidence or emission surface and, therefore, if such a concavity and a convexity are generated on the surface of the sealing resin 12, this will induce undesirable diffusion of light, thereby inducing an optical loss or inducing noises in optical signals. Therefore, it is preferable to suppress the occurrence of a concavity and a convexity as described above on the surface of the sealing resin 12 for making it closer to a flat surface. Subsequently, there will be described various types of structures and methods for flattening the surface of the sealing resin 12.

As a first method, it is possible to make the layer thickness of the sealing resin 12 in the direction of the Y axis sufficiently larger than the thickness of the optical element 11. If there is a layer thickness difference between areas adjacent to each other when the sealing resin 12 is cured, the curing in the area with the smaller layer thickness will be completed earlier. Accordingly, when the area with the smaller layer thickness is cured, the curing contraction of the sealing resin 12 is compensated by resin drawn from the adjacent area with the larger layer thickness, thereby alleviating the reduction of the layer thickness. On the other hand, in the area with the larger layer thickness which is cured later, the layer thickness of the sealing resin 12 is reduced due to the curing contraction of the sealing resin 12, thereby inducing a concavity and a convexity as illustrated in FIGS. 2(*a*) and (*b*). Namely, such a concavity and a convexity are caused by the difference between the time periods required for curing the area with the smaller layer thickness and the area with the larger layer thickness in the sealing resin 12. Further, the difference in time period required for curing is deemed to be strongly related to the layer thickness ratio. Namely, if the sealing resin 12 is entirely formed to have a larger layer thickness, the layer thickness ratio T2/T1 between the layer thickness T1 of the area with the smaller layer thickness and the layer thickness T2 of the area with the larger layer thickness becomes smaller, which reduces the difference in time period required for curing, thereby suppressing a concavity and a convexity as described above.

Figure 3:
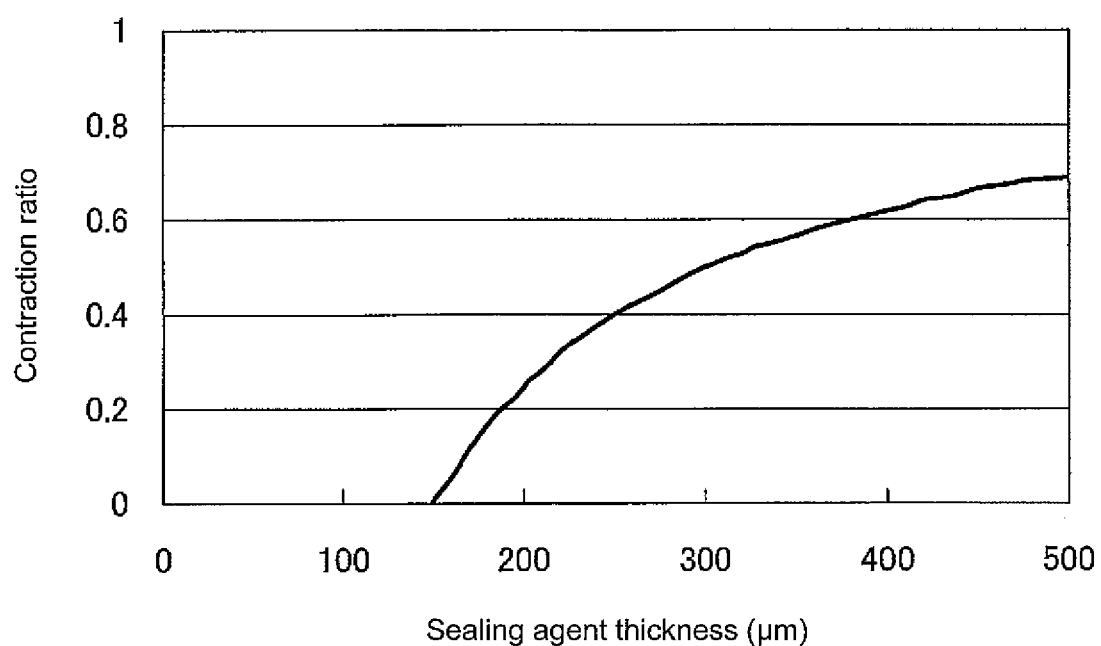
FIG. 3 is a graph illustrating the relationship between the thickness of the sealing resin and the contraction ratio.

FIG. 3 is a graph illustrating the relationship between the thickness of the sealing resin 12 and the contraction ratio, in the case where the optical element 11 has a thickness of 150 µm. It is preferable that the thickness of the sealing resin 12 is equal to or more than 1.5 times the thickness of the optical element 11 in the direction of the Y axis.

Figure 4:
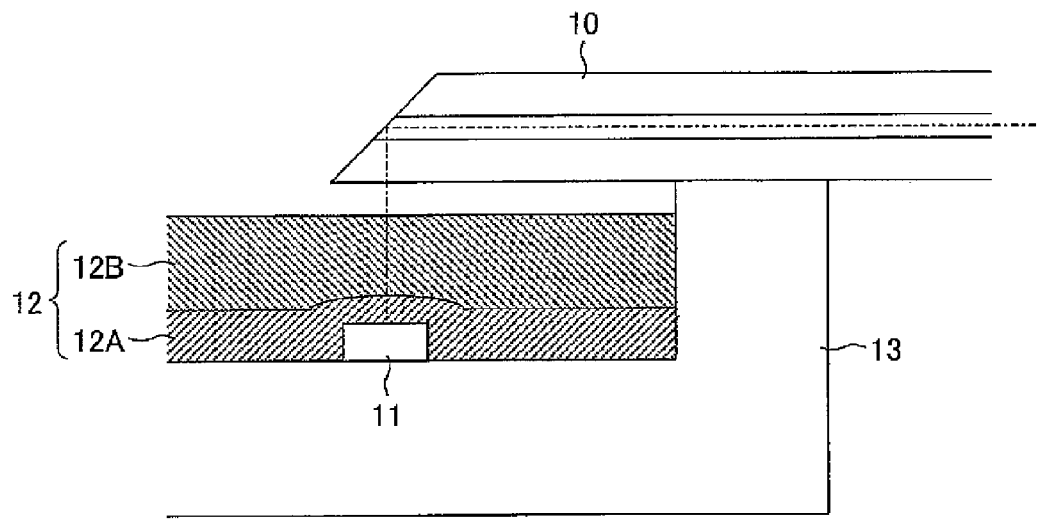
FIG. 4 is a cross-sectional view illustrating the structure of main parts of an optical module, illustrating an embodiment of the present invention.

As a second method, it is possible to form the sealing resin 12 in plural layers laminated in the direction of the Y axis. FIG. 4 illustrates an example where the sealing resin 12 has a two-layer structure constituted by a first resin layer 12A and a second resin layer 12B. In the case where the sealing resin 12 is formed to have a laminated-layer structure constituted by plural layers, a lower resin layer (the first resin layer 12A in FIG. 4) is cured and, thereafter, an upper resin layer (the second resin layer 12B in FIG. 4) is formed and cured thereon. This can flatten the concavity and convexity generated on the lower resin layer which has been cured and formed earlier, with the upper resin layer which is formed later.

Further, in the aforementioned second method which forms the sealing resin 12 in laminated plural layers, the number of laminated layers of the sealing resin 12 is not limited to two as in the example of FIG. 4 and can be three or more. Further, in order to prevent undesirable reflection of light at the interfaces among the respective laminated resin layers, it is preferable to cause the refractive indexes of the respective sealing-resin layers to be close to one another as much as possible. However, this is effective when the refractive indexes of the respective sealing resin layers are closer to one another than to the refractive index of air.

As a third method, it is possible to raise the height of the board surface of the support board 13 in the area around the optical element 11 for causing the light receiving or emitting surface of the optical element 11 and the raised board surface of the support board to be at substantially equal heights, in the direction of the Y axis. Namely, a concavity and a convexity as illustrated in FIG. 2 is caused by the presence of a layer thickness difference between adjacent areas as described above. By raising the height of the support board 13 in the area around the optical element 11 for causing the periphery of the light receiving or emitting surface of the optical element 11 to be at substantially equal heights, it is possible to eliminate the difference in the layer thickness of the sealing resin 12 around the light receiving or emitting surface, which can suppress the occurrence of a concavity and a convexity on the surface of the sealing resin 12 (at least the surface of its area for transmitting, therethrough, optical signals transmitted between the optical waveguide 10 and the optical element 11).

Figure 5:
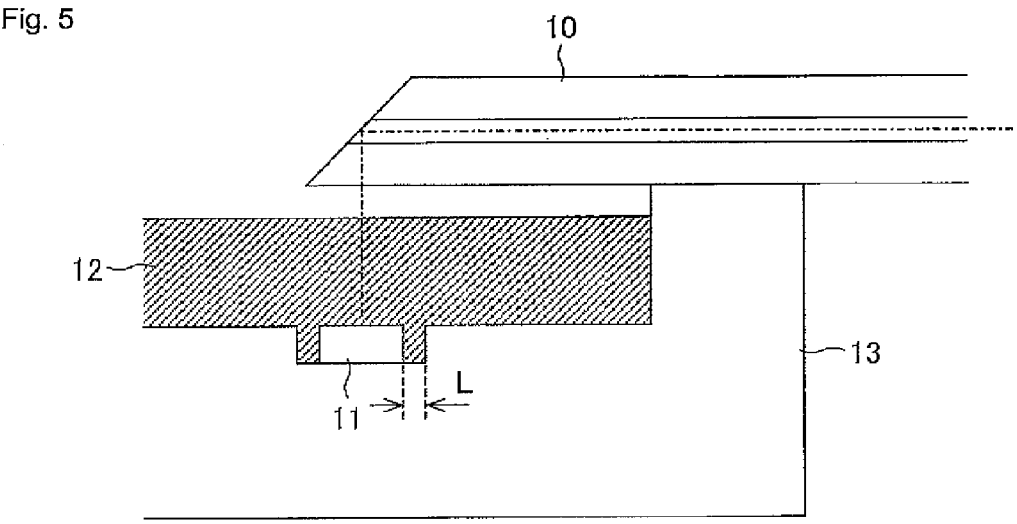
FIG. 5 is a cross-sectional view illustrating the structure of main parts of an optical module, illustrating an embodiment of the present invention.
Figure 6:
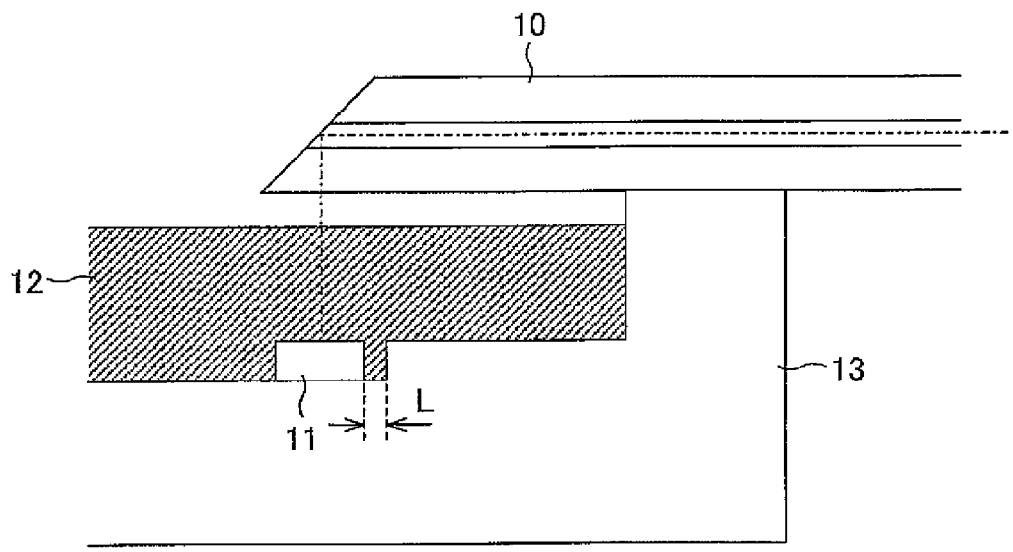
FIG. 6 is a cross-sectional view illustrating the structure of main parts of an optical module, illustrating an embodiment of the present invention.

Further, the support board 13 can be raised either over the entire periphery of the light receiving or emitting surface as illustrated in FIG. 5 or at a portion of the periphery of the light reception or emission as illustrated in FIG. 6. Also, ideally, it is preferable to cause the light receiving surface of the optical element 11 and the raised surface of the support board 13 to form a continuous surface. However, it is also possible to provide a gap with a certain size (a gap L in FIG. 5 and FIG. 6) between the optical element 11 and the raised portion of the support board 13, in order to facilitate mounting the optical element 11 on the support board 13.

Figure 7:
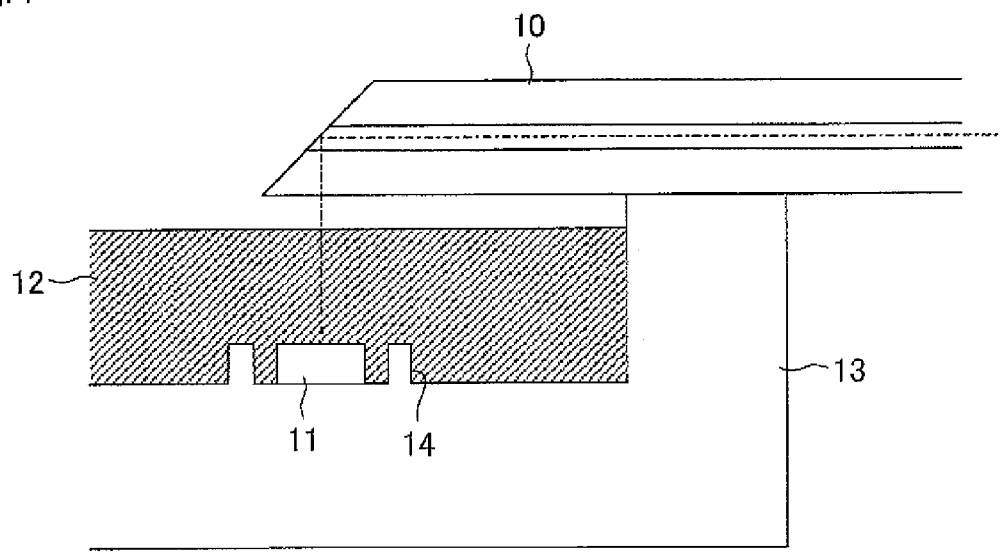
FIG. 7 is a cross-sectional view illustrating the structure of main parts of an optical module, illustrating an embodiment of the present invention.

Also, it is possible to provide a rib 14 around the optical element 11, as illustrated in FIG. 7, as an exemplary modification of the third method. Namely, the rib 14 can also raise the height of the area around the optical element 11, which can eliminate the difference in layer thickness in the sealing resin 12 around the light receiving or emitting surface, thereby suppressing the occurrence of a concavity and a convexity on the surface of the sealing resin 12.

Further, the occurrence of a concavity and a convexity as illustrated in FIG. 2 is also caused by the resin drawn from the adjacent area with the larger layer thickness during curing of the area with the smaller layer thickness. The rib 14 can suppress such drawing of the resin, namely the movement of the sealing resin 12 during curing contraction, and this effect can also suppress the occurrence of a concavity and a convexity as described above.

Figure 8:
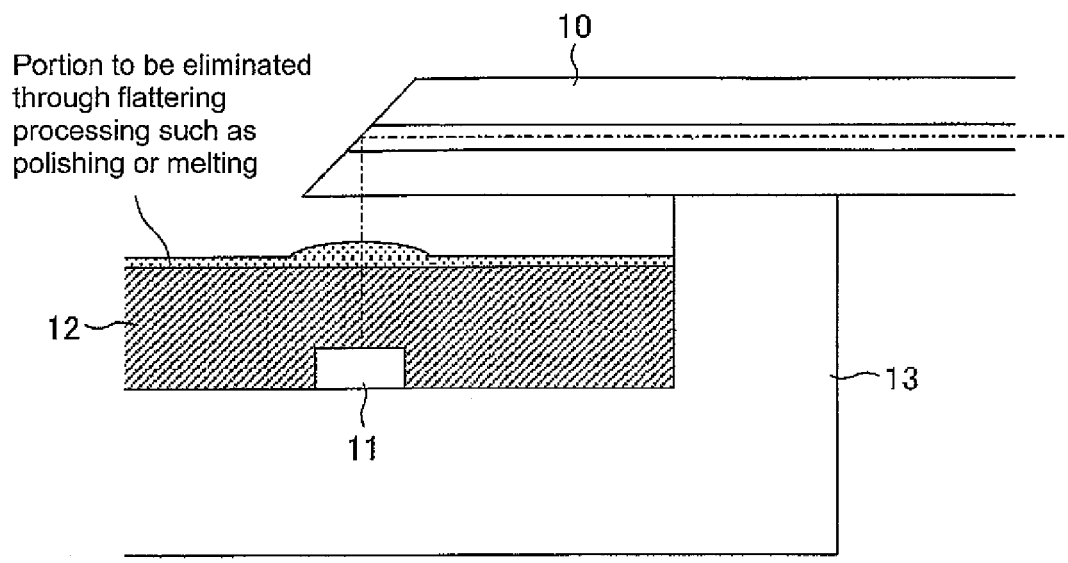
FIG. 8 is a cross-sectional view illustrating the structure of main parts of an optical module, illustrating an embodiment of the present invention.

As a fourth method, it is possible to apply flattening processing to the surface of the sealing resin 12 which has been cured. For example, as illustrated in FIG. 8, flattening processing such as polishing or melting can be performed to the surface of the sealing resin 12 which has been cured, which can eliminate the concavity and convexity generated by the curing contraction of the sealing resin 12, thus providing a flattened surface.

Figure 9:
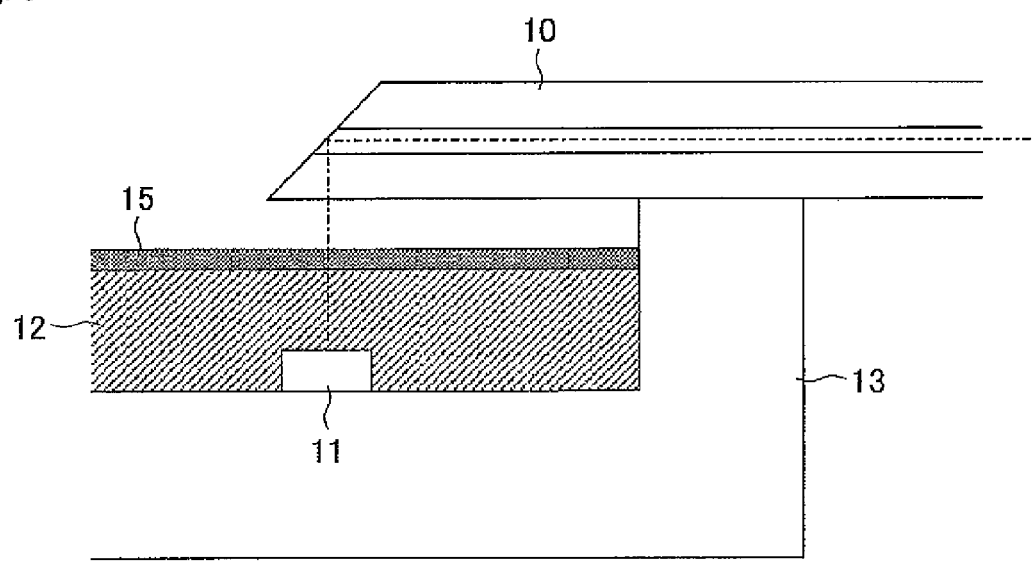
FIG. 9 is a cross-sectional view illustrating the structure of main parts of an optical module, illustrating an embodiment of the present invention.

As a fifth method, as illustrated in FIG. 9, it is possible to cure the sealing resin 12 in a state where a flat plate 15 is placed on the formed sealing resin 12, in order to prevent, during curing the sealing resin 12, the occurrence of a concavity and a convexity on the surface thereof. The flat plate 15 can be eliminated after the curing of the sealing resin 12 or can be left even after the curing of the sealing resin 12 by forming the flat plate 15 from a transparent resin plate, a glass plate or the like.

Also, in the aforementioned fifth method, similarly, curing contraction occurs during the curing of the sealing resin 12 and, therefore, a gap can be generated between the sealing resin 12 and the flat plate 15 in cases where the sealing resin 12 has a large curing contraction coefficient. Also, density differences may be induced within the sealing resin 12 which has been cured, and the refractive index thereof can not be made uniform.

Figure 10:
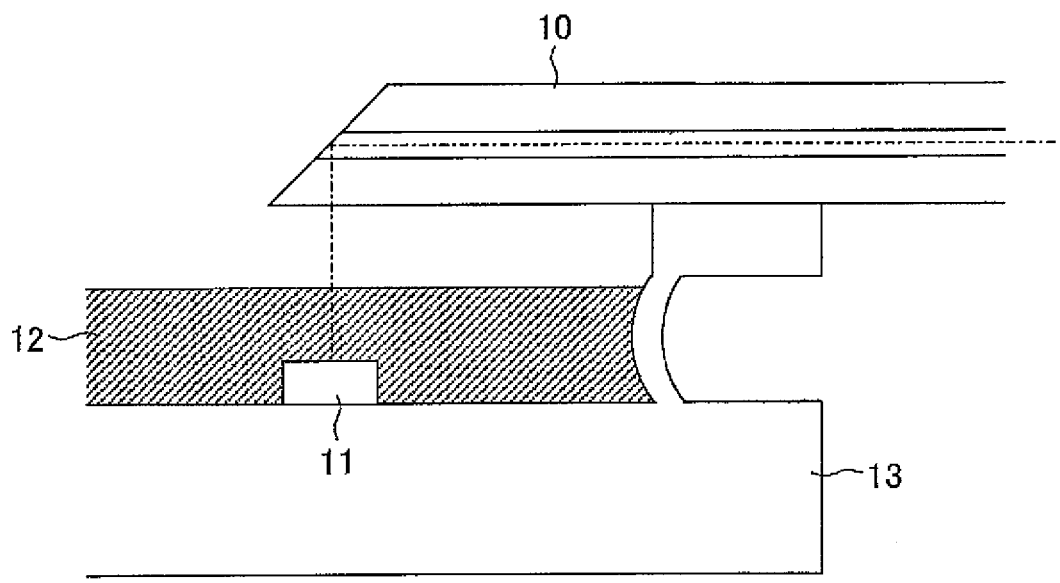
FIG. 10 is a cross-sectional view illustrating the structure of main parts of an optical module, illustrating an embodiment of the present invention.
Figure 11:
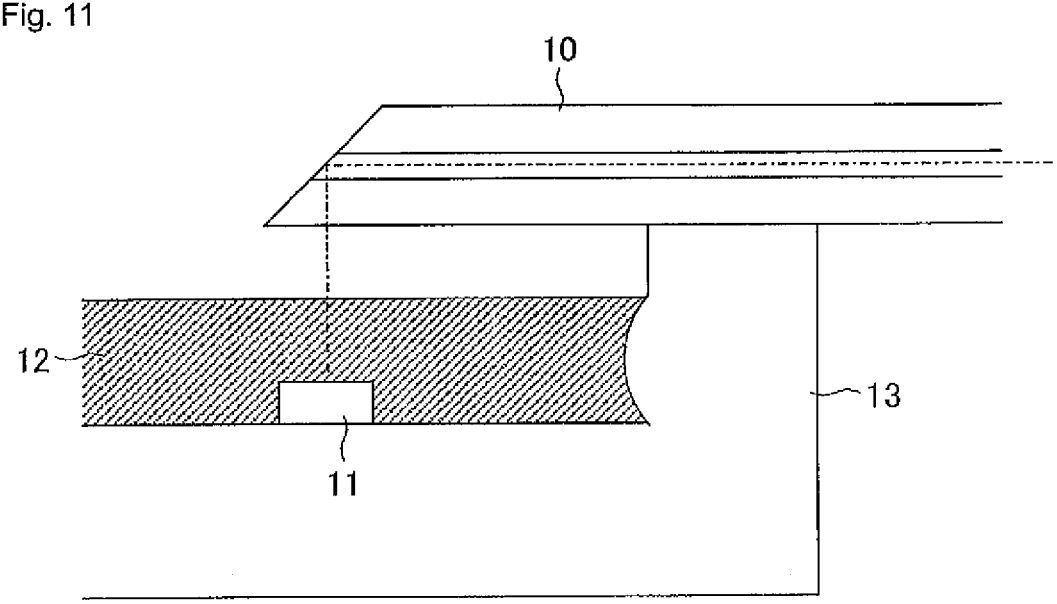
FIG. 11 is a cross-sectional view illustrating the structure of main parts of an optical module, illustrating an embodiment of the present invention.
Figure 12:
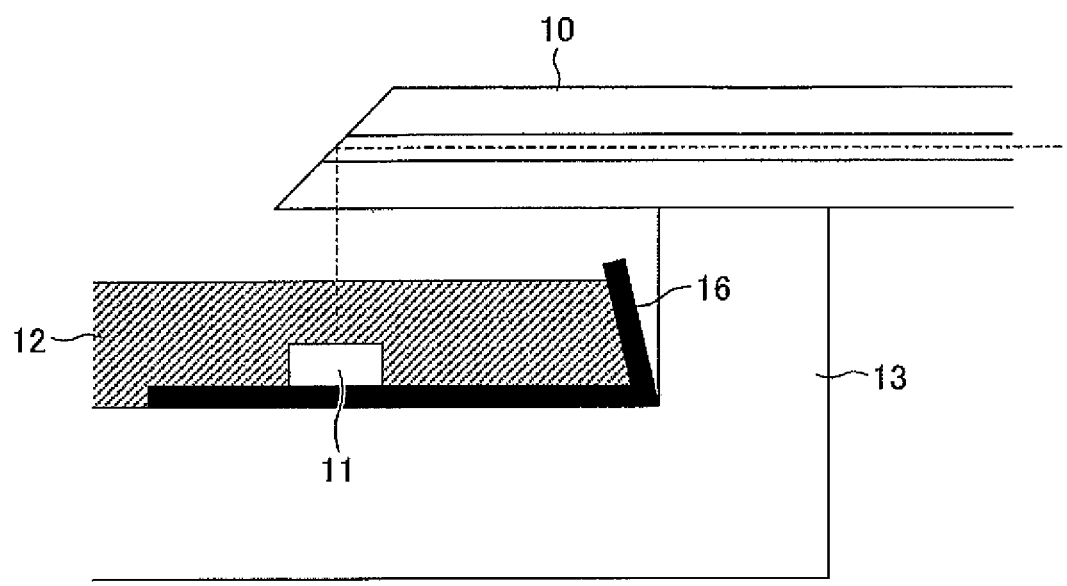
FIG. 12 is a cross-sectional view illustrating the structure of main parts of an optical module, illustrating an embodiment of the present invention.

In order to prevent the occurrence of such a gap and density differences, it is possible to provide an area which deforms in conformance to the curing contraction of the sealing resin 12, at least at a portion of the portion of the support board 13 which contacts with the sealing resin 12. FIGS. 10 to 12 illustrate an exemplary structure in which an area which deforms in conformance to the curing contraction of the sealing resin 12 is provided.

FIG. 10 illustrates an example where a portion of the support board 13 is decreased in board thickness and is shaped to be deformable in conformance to the curing contraction of the sealing resin 12. This deformable portion can be formed from a rubber, a resin with a smaller thickness, a metal plate or the like.

FIG. 11 illustrates an example where at least a portion of the portion of the support board 13 which contacts with the sealing resin 12 is made of an easily-deformable material, such as a rubber or a silicon resin, for causing it to be a material which can deform in conformance to the curing contraction of the sealing resin 12.

FIG. 12 illustrates an example where at least a portion of the portion which contacts with the sealing resin 12 is provided with a deformable material 16 which can deform in conformance to the curing contraction of the sealing resin 12. This deformable member 16 can be preferably formed from a thin metal plate, a resin plate or the like.

Figure 13:
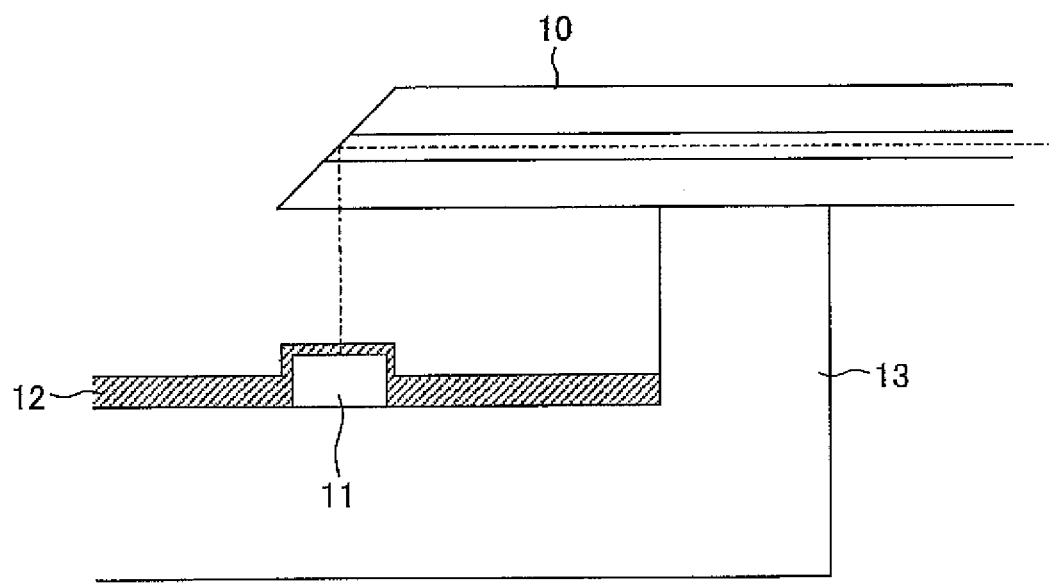
FIG. 13 is a cross-sectional view illustrating the structure of main parts of an optical module, illustrating an embodiment of the present invention.

As a sixth method, as illustrated in FIG. 13, it is possible to make the layer thickness of the sealing resin 12 sufficiently smaller than the thickness of the optical element 11. Namely, by causing the surface of the sealing resin 12 to be at a height smaller than the height of the optical element 11, it is possible to prevent the contraction of the sealing resin 12 around the optical element 11 from affecting the sealing resin 12 on the optical element 11. Further, in this case, on the surface of the optical element 11 which is at a height greater than the height of the surface of the sealing resin 12, a thin film of the sealing resin 12 is formed through the wettability of the sealing resin 12, and this resin film can seal the optical element 11.

With the first to fifth methods, out of the aforementioned respective methods for flattening the sealing resin 12, it is possible to prevent the occurrence of a concavity and a convexity on the resin surface due to the curing contraction of the sealing resin 12. However, in cases where the support board 13 has poor surface wettability, a concavity and a convexity be generated on the surface of the sealing resin 12 due to the influence of the surface tension of the sealing resin 12, in the phase where the sealing resin 12 has been formed on the support board 13.

Figure 14:
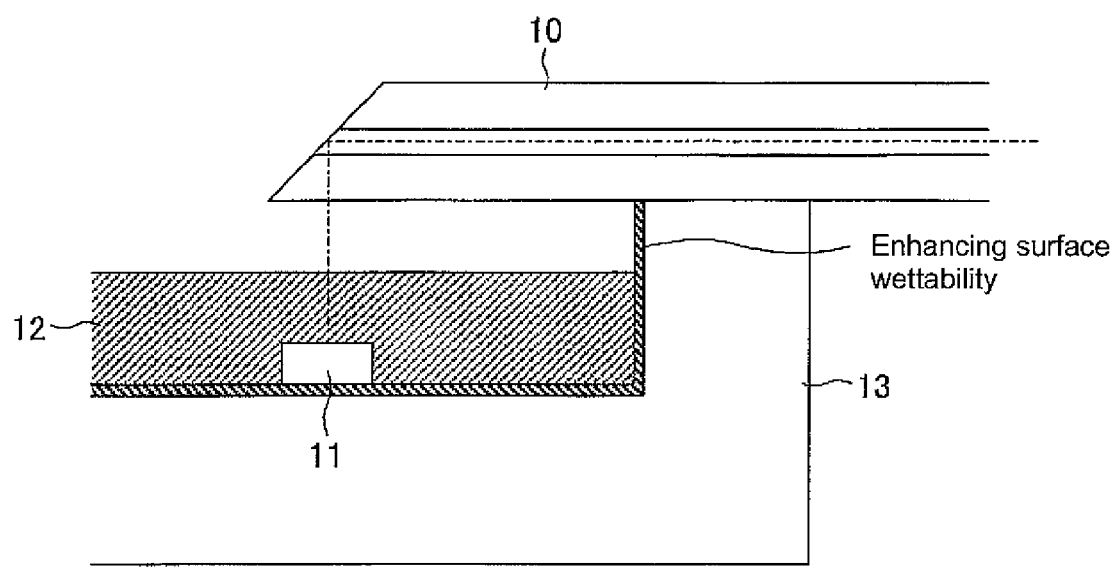
FIG. 14 is a cross-sectional view illustrating the structure of main parts of an optical module, illustrating an embodiment of the present invention.

In order to prevent the occurrence of a concavity and a convexity due to the influence of the surface tension of the sealing resin 12 as described above, as illustrated in FIG. 14, it is preferable to enhance the surface wettability of the surface of the support board 13 on which the sealing resin 12 is formed. As methods for enhancing the wettability of the support board 13, it is possible to employ the following methods and the like.

(1) A method of applying UV cleaning, corona discharge and plasma processing to the surface of the support board 13 for enhancing the wettability of the surface (surface activation processing)

(2) A method of applying a material for enhancing the wettability (so-called a primer) to the surface of the support board 13.

(3) A method of interposing a member (a glass, a metal or the like) with higher wettability than that of the support board 13 at the interface between the support board 13 and the sealing resin 12.

Figure 15:
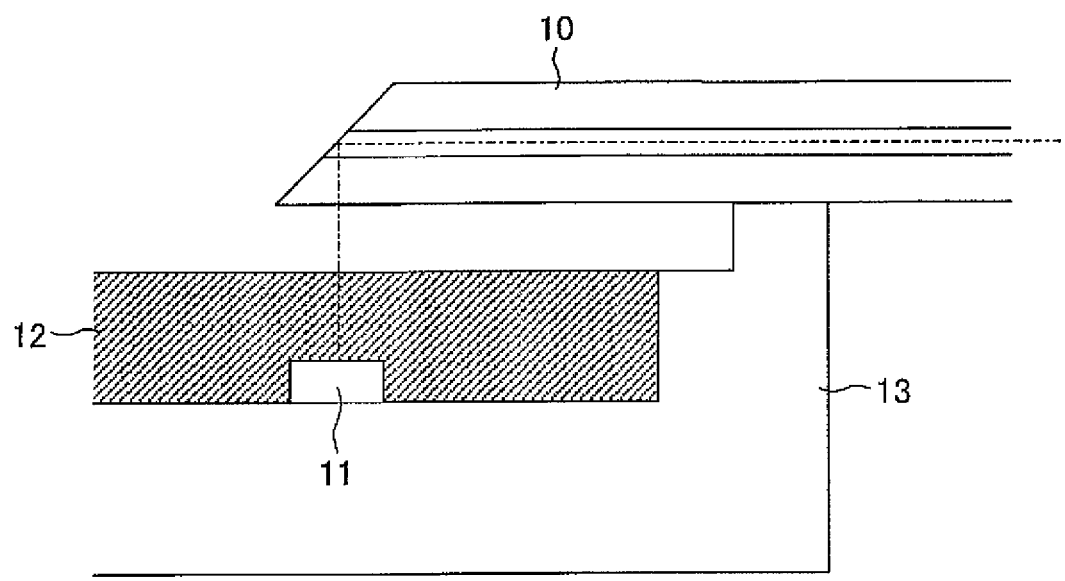
FIG. 15 is a cross-sectional view illustrating the structure of main parts of an optical module, illustrating an embodiment of the present invention.

Further, as another method for preventing the occurrence of a concavity and a convexity due to the influence of the surface tension of the sealing resin 12, as illustrated in FIG. 15, it is possible to provide a step in the surface of the support board 13 which contacts with the sealing resin 12 (its surface perpendicular to the X axis). In this case, the surface of the aforementioned step is made substantially coincident with the surface of the sealing resin 12, thereby preventing the occurrence of a concavity and a convexity as described above.

Figure 16:
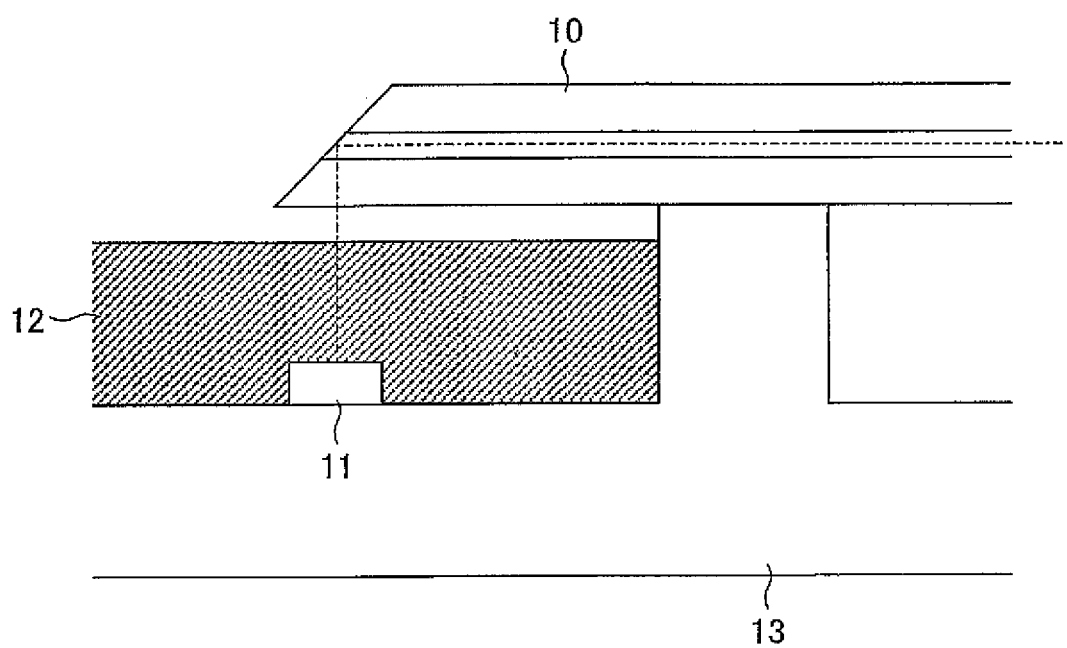
FIG. 16 is a cross-sectional view illustrating the structure of main parts of an optical module, illustrating an embodiment of the present invention.

Further, although there have been exemplified cases where the respective structures and the respective methods described with reference to FIG. 1 and FIG. 15 are applied to an end portion of the support board 13, the present invention is not limited thereto, and they can be applied to arbitrary portions of the support board 13, as illustrated in FIG. 16.

Also, in cases where an optical waveguide is utilized for connecting circuits to one another on a board for integrating the circuits, it is possible to apply the present invention to plural positions on a single support board 13.

Figure 17:
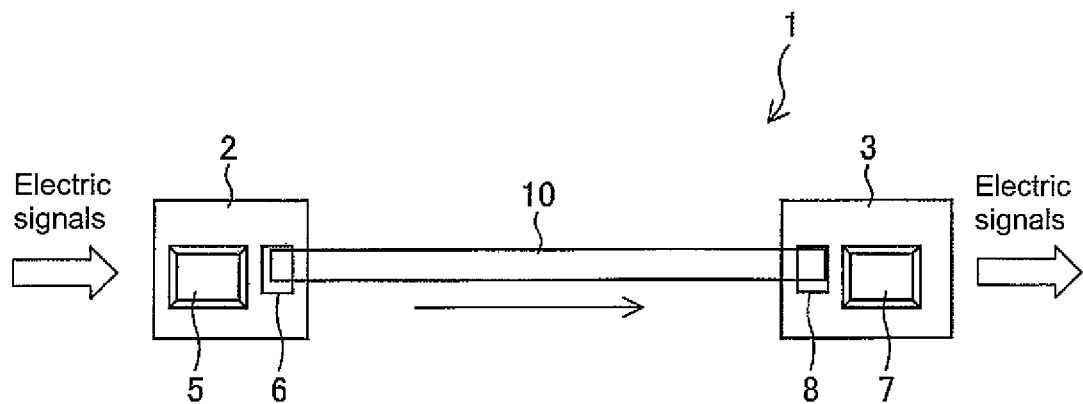
FIG. 17 is a view illustrating the schematic structure of an optical transmission module according to the present embodiment.

By providing a light receiving device and a light emitting device at the opposite ends of the optical waveguide 10 as an optical transmission path, the optical module 1 can be caused to function as an optical transmission module 1. FIG. 17 illustrates a schematic structure of the optical transmission module 1 according to the present embodiment. As illustrated in the same figure, the optical transmission module 1 includes an optical transmission processing portion 2, an optical reception processing portion 3 and an optical waveguide 10.

The optical transmission processing portion 2 is structured to include a light-emission driving portion 5 and a light emission portion 6. The light-emission driving portion 5 drives the light emission from the light emission portion 6, on the basis of electric signals inputted thereto from the outside. This light-emission driving portion 5 is constituted by an IC (Integrated Circuit) for driving the light emission, for example. Although not illustrated, the light-emission driving portion 5 is further provided with a portion for electrically connecting it to an electric wiring for transmitting electric signals from the outside.

The light emission portion 6 emits light by being driven and controlled by the light-emission driving portion 5. The light emission portion 6 is constituted by a light emitting device, such as a VCSEL (Vertical Cavity-Surface Emitting Laser), for example. The light emitted from the light emission portion 6 is directed as optical signals to the light-incidence side end portion of the optical waveguide 10.

The light reception processing portion 3 is structured to include an amplifier portion 7 and a light reception portion 8. The light receiving portion 8 receives light as optical signals emitted from the light-emission side end portion of the optical transmission path 4 and outputs electric signals resulted from photoelectric conversion. This light reception portion 8 is constituted by a light receiving device such as a PD (Photo-Diode), for example.

The amplifier portion 7 amplifies the electric signals outputted from the light receiving portion 8 and outputs the amplified electric signals to the outside. The amplification portion 7 is constituted by an IC for amplification, for example. Further, although not illustrated, the amplification portion 7 is provided with a portion for electrically connecting it to an electric wiring for transmitting electric signals to the outside.

The optical waveguide 10 is a medium for transmitting the light emitted from the light emission portion 6 to the light receiving portion 8, as described above.

The optical transmission module 10 according to one or more embodiments of the present invention can be applied to exemplary applications as follows. Further, in the exemplary applications which will be described later, only the optical waveguide 10 will be illustrated in the optical transmission module according to one or more embodiments the present invention, but the other portions will not be illustrated.

As a first exemplary application, the optical transmission module according to one or more embodiments of the present invention can be employed in a hinge portion in a folding type electronic apparatus, such as a folding type cellular phone, a folding type PHS (personal handyphone system), a folding type PDA (personal digital assistant), a folding type notebook-size personal computer.

Figure 18:
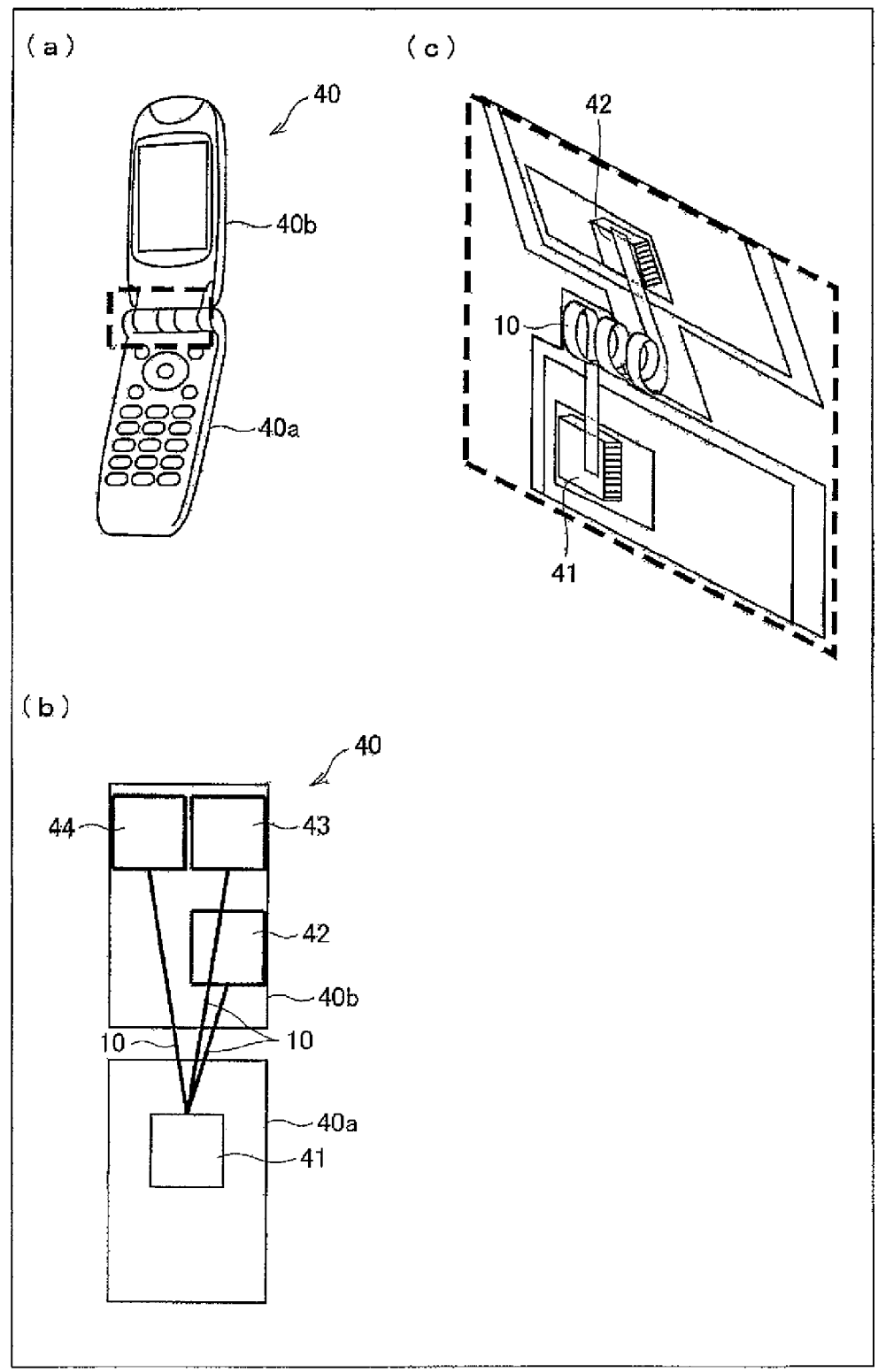
FIG. 18($a$) is a perspective view illustrating the external appearance of a folding type cellular phone including an optical transmission module according to the present invention, ($b$) is a block diagram of the portion of the folding type cellular phone illustrated in (a) to which the aforementioned optical transmission path is applied, and ($c$) is a perspective plan view of a hinge portion of the folding type cellular phone illustrated in (a).

FIG. 18 illustrates an example where an optical transmission module including optical waveguides 10 is applied to a folding type cellular phone 40. Namely, FIG. 18(a) is a perspective view illustrating the external appearance of the folding type cellular phone 40 incorporating the optical waveguides 10.

FIG. 18(b) is a block diagram of the portion of the folding type cellular phone 40 illustrated in (a) to which the optical waveguides 10 are applied. As illustrated in the figure, the optical waveguides 10 connect, to one another, a control portion 41 provided in a main body 40a in the folding type cellular phone 40, an external memory 42 provided in a lid (a driving portion) 40b which is provided at one end of the main body rotatably about a hinge portion as a shaft, a camera portion (digital camera) 43, a display portion (a liquid crystal display) 44.

FIG. 18(c) is a perspective plan view of the hinge portion in (a) (the portion enclosed by a broken line). As illustrated in the figure, the optical waveguide 10 is bent by being wound around a supporting rod in the hinge portion for connecting the control portion provided in the main body, the external memory 42 provided in the lid, the camera portion 43 and the display portion 44 to one another.

By applying the optical waveguide 10 to such folding type electronic apparatuses, it is possible to realize high-speed and large-capacity communication within limited spaces. Accordingly, the optical waveguide 10 is particularly suitable for apparatuses which are required to perform high-speed and large-capacity data communication and also are required to have reduced sizes, such as folding-type liquid crystal display devices.

As a second exemplary application, an optical transmission module including an optical waveguide 10 can be applied to a device having a driving portion, such as a printer head in a printing machine (an electronic apparatus) and a reading portion in a hard disk recording/replaying apparatus.

Figure 19:
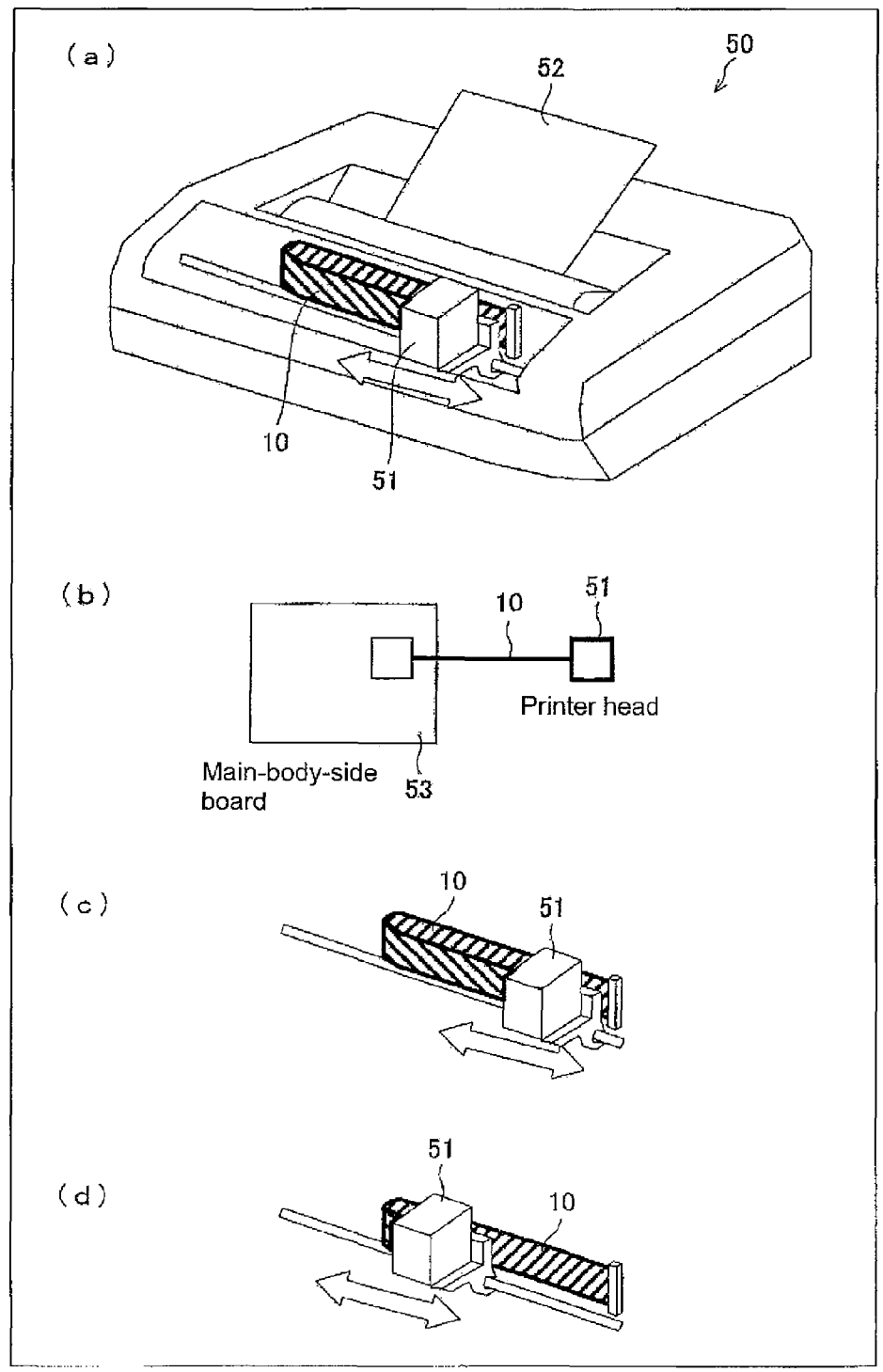
FIG. 19($a$) is a perspective view illustrating the external appearance of a printing machine including an optical transmission module according to the present embodiment, ($b$) is a block diagram illustrating main portions in the printing machine illustrated in (a), and (c) and (d) are perspective views illustrating states of curvatures of the optical transmission path when a printer head is moved (driven) in the printing machine.

FIG. 19 illustrates an example where the optical waveguide 10 is applied to a printing machine 50. FIG. 19(a) is a perspective view illustrating the external appearance of the printing machine 50. As illustrated in the figure, the printing machine 50 includes a printer head 51 for performing printing on a sheet 52 while moving in the widthwise direction of the sheet 52, and the optical waveguide 10 is connected at its one end to the printer head 51.

FIG. 19(b) is a block diagram of the portion of the printing machine 50 to which the optical waveguide 10 is applied. As illustrated in the figure, the optical waveguide 10 is connected at its one end portion to the printer head 51 and also is connected at the other end portion thereof to a board in the main body of the printing machine 50. Further, the board in the main body includes a control means for controlling the operations of the respective portions of the printing machine 50, and the like.

FIGS. 19(c) and (d) are perspective views illustrating states of curvatures of the optical waveguide 10, when the printer head 51 is moved (driven) in the printing machine 50. As illustrated in the figure, in the case where the optical waveguide 10 is applied to a driving portion such as the printer head 51, the state of the curvature of the optical waveguide 10 is changed by the driving of the printer head 51 and, also, the optical waveguide 10 is repeatedly curved at respective positions thereon.

Accordingly, the optical waveguide 10 according to the present embodiment is suitable in driving portions as described above. Further, by applying the optical waveguide 10 to such driving portions, it is possible to realize high-speed and large-capacity communication using such driving portions.

Figure 20:
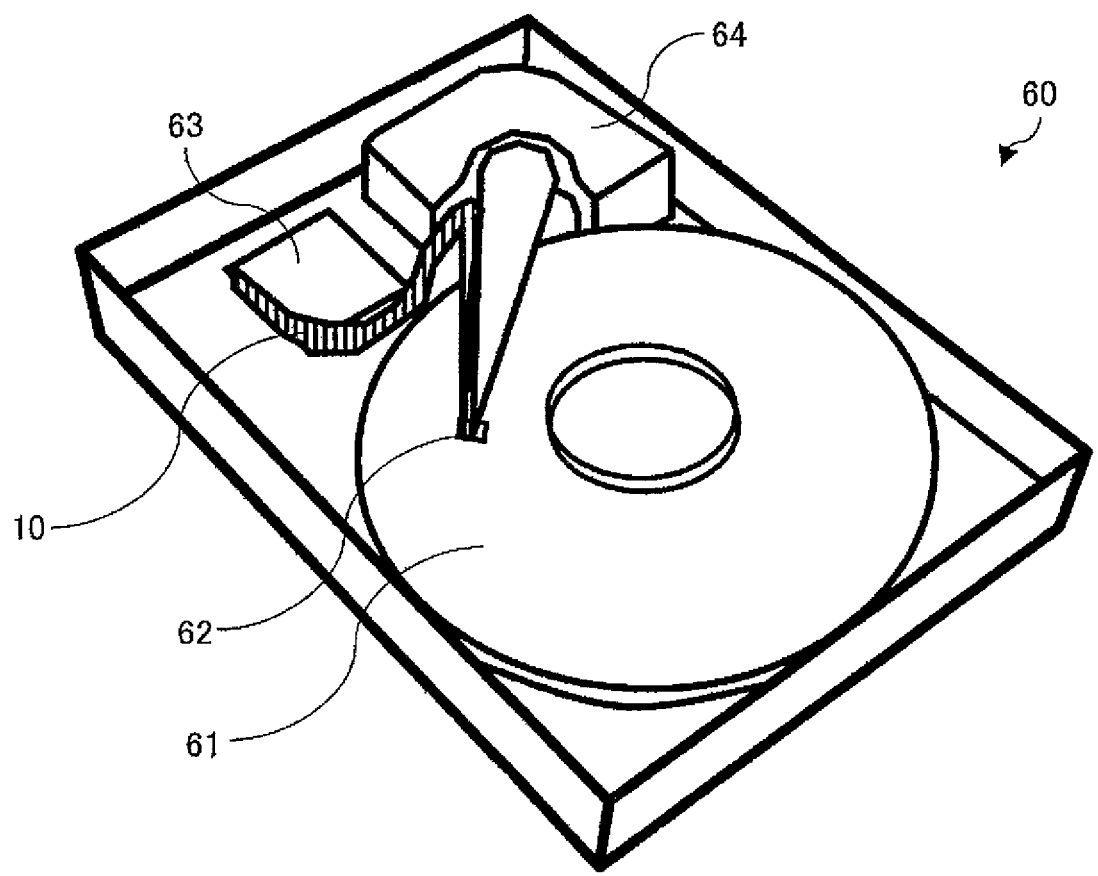
FIG. 20 is a perspective view illustrating the external appearance of a hard disk recording/replaying apparatus including an optical transmission module according to the present embodiment.
Figure 21:
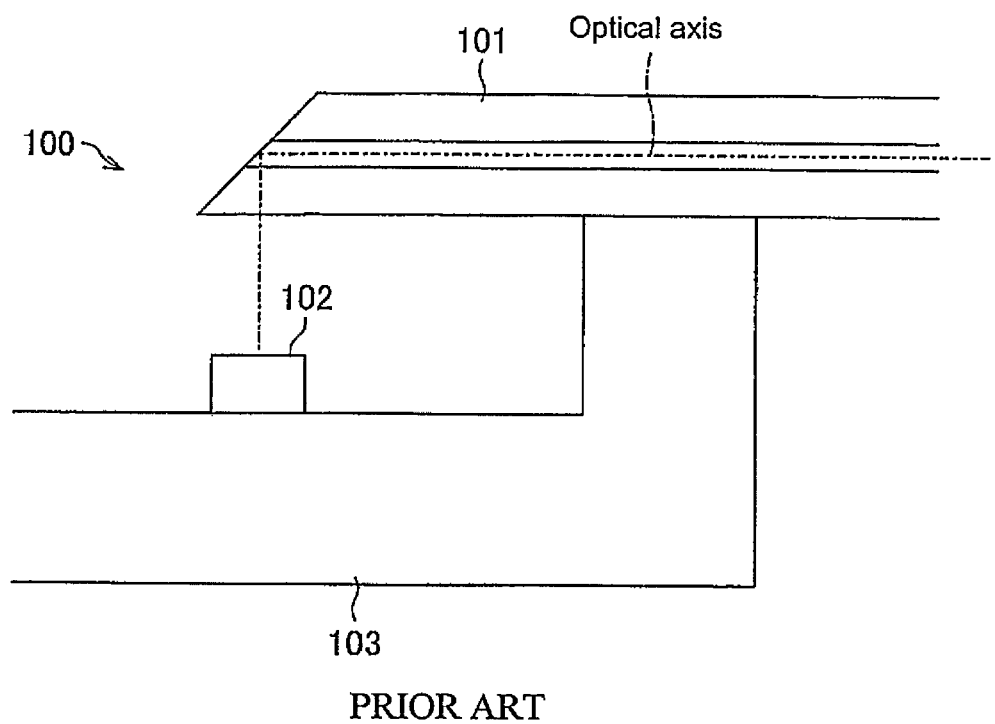
FIG. 21 is a cross-sectional view illustrating the structure of main portions of a conventional optical module.
Figure 22:
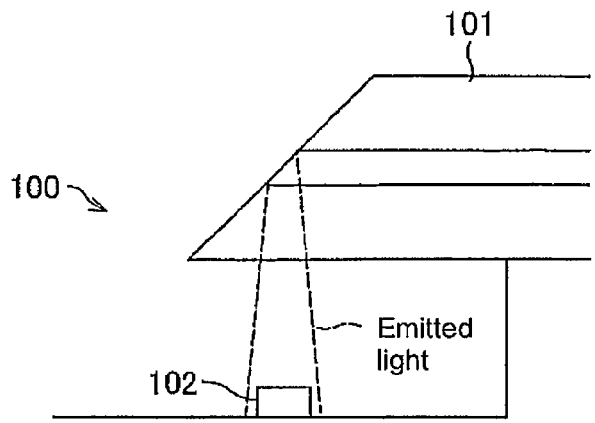
FIG. 22 is a view illustrating diffusion of signal light in a conventional optical module.
Figure 23:
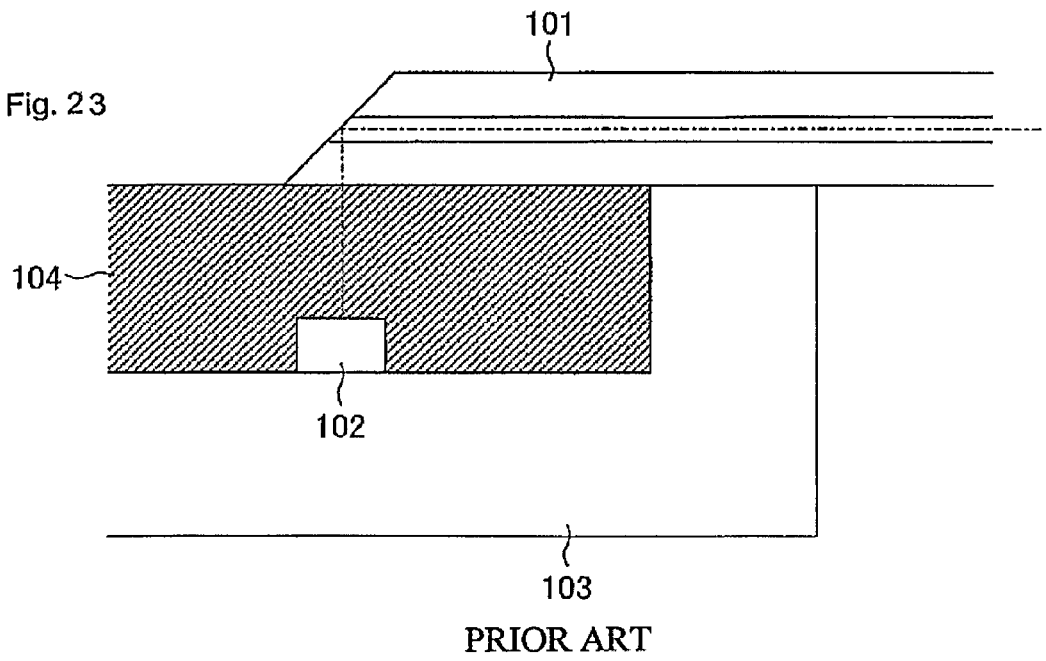
FIG. 23 is a cross-sectional view illustrating the structure of main portions of a conventional optical module.

FIG. 20 illustrates an example where the optical waveguide 10 is applied to a hard disk recording/replaying apparatus 60.

As illustrated in the figure, the hard disk recording/replaying apparatus 60 includes a disk (hard disk) 61, a head (reading and writing head) 62, a board introducing portion 63, a driving portion (a driving motor) 64 and an optical waveguide 10.

The driving portion 64 drives the head 62 in the radial direction of the disk 61. The head 62 reads information recorded in the disk 61 or writes information in the disk 61. Further, the head 62 is connected to the board introducing portion 63 through the optical waveguide 10 for transmitting the information read from the disk 61 as optical signals to the board introducing portion 63 and for receiving optical signals of information to be written in the disk 61 which has been transmitted from the board introducing portion 63.

As described above, by applying the optical waveguide 10 to a driving portion such as the head 62 in the hard disk recording/replaying apparatus 60, it is possible to realize high-speed and large-capacity communication.

As described above, an optical module according to one or more embodiments of the present invention is an optical module including a support board, an optical transmission path and at least a single optical element having a light receiving function or a light emitting function provided on the support board, wherein a light emission surface of the aforementioned optical transmission path or a light incidence surface of the optical transmission path is placed at such a position as to cause the aforementioned optical element and the aforementioned optical transmission path to be optically coupled to each other, with respect to a light receiving surface or a light emitting surface of the aforementioned optical element, the aforementioned optical element is sealed by a sealing agent, and a gap is provided between the aforementioned optical transmission path and the surface of the aforementioned sealing agent on the light receiving surface or the light emitting surface of the aforementioned optical element.

Further, a method for producing an optical module according to one or more embodiments of the present invention is a method for producing an optical module including a support board, an optical transmission path and at least a single optical element having a light receiving function or a light emitting function provided on the support board, which includes a first step for mounting the optical element on the aforementioned support board, applying a sealing agent thereto to have a predetermined thickness thereon and then curing it, and a second step for adhering and securing the optical transmission path to the support board, wherein the aforementioned optical transmission path includes an optical-path changeover mirror, a light emission surface of the aforementioned optical transmission path or a light incidence surface of the optical transmission path is placed at such a position as to cause the aforementioned optical element and the aforementioned optical transmission path to be optically coupled to each other, with respect to a light receiving surface or the light emitting surface of the aforementioned optical element and, in the second step, the thickness of the aforementioned sealing agent is set to be a thickness which provides a gap between the aforementioned optical transmission path and the surface of the aforementioned sealing agent on the light receiving surface or the light emitting surface of the aforementioned optical element.

With the aforementioned structure, the sealing agent can be embedded in most of the gap between the optical transmission path and the optical element. This can reduce the diffusion of light between the optical transmission path and the optical element and, this effect can increase the optical coupling efficiency.

Further, since a gap is provided between the emission surface or the incidence surface of the optical transmission path and the surface of the sealing agent on the light receiving surface or the light emitting surface of the optical element, the surface of the optical transmission path which is faced to the optical deice does not contact with the sealing agent. This prevents the curing contraction of the sealing agent from affecting the optical transmission path. This can realize excellent alignment accuracy in adhering and securing the optical transmission path to the support board.

Further, the aforementioned optical element means a light emitting device on the side of light incidence to the optical transmission path or a light receiving device on the side of light emission from the optical transmission path.

Further, in the aforementioned optical module, the aforementioned sealing agent is formed in plural layers laminated in the direction of the normal to the surface of the aforementioned support board on which the aforementioned optical element is mounted.

Also, in the aforementioned method for producing the optical module, the aforementioned sealing agent is applied in plural laminated layers and, after a layer formed earlier is cured, a layer to be formed later is laminated thereon.

With the aforementioned structure, since the sealing agent is formed to have a laminated-layer structure constituted by plural layers, a lower resin layer is cured and, thereafter, an upper resin layer is formed and cured thereon. This can flatten the concavity and convexity generated on the lower resin layer which has been cured and formed earlier, with the upper resin layer which is formed later.

Further, in the aforementioned optical module, it is possible to raise the board surface of the support board at least at a portion of the area around the optical element for causing the raised board surface of the support board and the light receiving or emitting surface of the optical element to be at substantially equal heights, in the direction of the normal to the surface of the aforementioned support board on which the aforementioned optical element is mounted.

With the aforementioned structure, since the height of the support board is raised in the area around the optical element for causing the periphery of the light receiving or emitting surface of the optical element to be at substantially equal heights, it is possible to eliminate the difference in the thickness of the sealing agent around the light receiving or emitting surface, which can suppress the occurrence of a concavity and a convexity on the surface of the sealing agent.

Further, in the aforementioned optical module, it is preferable to place a flat plate with optical transparency on the aforementioned sealing agent with an interval equivalent to the thickness of the sealing agent interposed therebetween, in consideration of mounting of the optical element, although it is ideal to provide no interval between the optical transmission path and the optical element.

Also, in the aforementioned method for producing the optical module, it is possible to cure the aforementioned sealing agent, in a state where a flat plate is placed on the aforementioned sealing agent applied on the aforementioned support board, in the aforementioned first step.

With the aforementioned structure, it is possible to cure the sealing agent in a state where a flat plate is placed on the applied sealing agent, in order to prevent, during curing the sealing agent, the occurrence of a concavity and a convexity on the surface thereof. The flat plate can be eliminated after the curing of the sealing agent or can be left even after the curing of the sealing agent by forming the flat plate from an optically-transparent member.

Further, it is possible to provide an area which deforms in conformance to the curing contraction of the sealing agent, at least at a portion of the portion of the support board which contacts with the sealing agent.

Also, in the aforementioned method for producing the optical module, the aforementioned sealing agent can be cured, in a state where an area which deforms in conformance to the curing contraction of the sealing agent is provided at least at a portion of the portion of the support board which contacts with the sealing agent.

With the aforementioned structure, since an area which deforms in conformance to the curing contraction of the sealing agent is provided at least at a portion of the portion of the support board which contacts with the sealing agent, it is possible to absorb the curing contraction of the sealing agent which occurs during curing the sealing agent through the deformation of the aforementioned area. This can prevent malfunctions, such as the occurrence of a gap between the sealing agent and the flat plate and the occurrence of density differences in the cured sealing agent and, therefore, non-uniformity of the refractive index.

Further, in the aforementioned optical module, a member with higher wettability than that of the supporting member can be sandwiched at the interface between the aforementioned support board and the aforementioned sealing agent.

Also, in the aforementioned method for producing the optical module, in the aforementioned first step, it is possible to apply, to the surface of the aforementioned support board, processing for enhancing the wettability (for example, board surface processing such as corona discharge, plasma processing and UV cleaning, and application of a primer to the board surface), before the application of the aforementioned sealing agent on the aforementioned support board.

In cases where the support board has poor surface wettability, a concavity and a convexity may be generated on the surface of the sealing agent due to the influence of the surface tensity of the sealing agent, in the phase where the sealing agent has been applied on the support board. With the aforementioned structure, it is possible to enhance the surface wettability of the surface of the support board on which the sealing agent is applied, thereby reducing the occurrence of a concavity and a convexity as described above.

Also, with the aforementioned method for producing the optical module, after the aforementioned first step, but before the aforementioned second step, flattering processing can be performed to the surface of the sealing agent on the light receiving surface or the light emitting surface of the optical element.

With the aforementioned structure, flattering processing (for example, polishing, melting or the like) can be performed on the surface of the sealing agent which has been cured, which can eliminate the concavity and convexity generated by the curing contraction of the sealing agent, thereby providing a flattened surface.

Further, in the aforementioned optical module, the layer thickness of the aforementioned sealing agent can be made equal to or more than 1.5 times the thickness of the aforementioned optical element in the direction of the normal to the surface of the aforementioned support board on which the aforementioned optical element is mounted.

If there is a layer thickness difference between areas adjacent to each other when the sealing agent is cured, the curing of the area with the smaller layer thickness will be completed earlier. Accordingly, when the area with the smaller layer thickness is cured, the curing contraction of the sealing agent is compensated by resin drawn from the adjacent area with the larger layer thickness, thereby alleviating the reduction of the layer thickness. On the other hand, in the area with the larger layer thickness which is cured later, the layer thickness of the sealing agent is reduced due to the curing contraction of the sealing agent. In the sealing agent on the optical element, a layer thickness difference occurs in the sealing agent due to the thickness of the optical element, which induces a concavity and a convexity on the surface of the sealing agent, thereby adversely affecting the transmission of optical signals between the optical transmission path and the optical element. The occurrence of such a concavity and a convexity becomes more prominent with increasing layer thickness ratio $T2/T1$ between the layer thickness $T1$ of the area with the smaller layer thickness and the layer thickness $T2$ of the area with the larger layer thickness.

With the aforementioned structure, since the layer thickness of the aforementioned sealing agent is made sufficiently larger than the thickness of the aforementioned optical element, it is possible to reduce the aforementioned layer thickness ratio $T2/T1$, thereby suppressing the occurrence of a concavity and a convexity due to the curing contraction during the curing of the sealing agent.

Further, in the aforementioned optical module, the layer thickness of the aforementioned sealing agent can be made smaller than the thickness of the aforementioned optical element, in the direction of the normal to the surface of the support board on which the aforementioned optical element is mounted.

With the aforementioned structure, the surface of the sealing resin can be caused to be at a height smaller than the height of the optical element, which can prevent the contraction of the sealing resin around the optical element from affecting the sealing resin on the optical element.

The present invention is not limited to the aforementioned embodiments, and various types of changes can be made without departing from the scope defined by the claims. Namely, the technical scope of the present invention is intended to cover embodiments provided by combining technical means properly changed within the scope defined by the claims.

The invention claimed is:

1. An optical module comprising:
    a support board;
    an optical transmission path; and
    at least a single optical element having a light receiving function or a light emitting function provided on the support board, wherein
        a light emission surface of said optical transmission path or a light incidence surface of the optical transmission path is arranged such that said optical element and said optical transmission path are optically coupled to each other, with respect to a light receiving surface or a light emitting surface of said optical element,
        said optical element is sealed by a sealing agent, and
        a gap is provided between said optical transmission path and the surface of said sealing agent on the light receiving surface or the light emitting surface of said optical element,
    wherein the optical transmission path protrudes from the support board on a side of the at least a single optical element, and
    wherein a member with higher wettability than that of the supporting member is sandwiched at the interface between said support board and said sealing agent.

2. The optical module according to claim 1, wherein said sealing agent is formed in plural layers laminated in the direction of the normal to the surface of said support board on which said optical element is mounted.

3. The optical module according to claim 1, wherein at least a portion of the board surface of the support board is raised around said optical element such that the raised board surface of the support board and the light receiving or emitting surface of said optical element have substantially equal heights, in the direction of a normal to the surface of said support board on which said optical element is mounted.

4. The optical module according to claim 1, wherein a flat plate with optical transparency is placed on said sealing agent.

5. The optical module according to claim 1, wherein an area which deforms in conformance to the curing contraction of the sealing agent is provided on the portion of the support board which contacts with the sealing agent.

6. The optical module according to claim 1, wherein the layer thickness of said sealing agent at least 1.5 times the thickness of said optical element, in the direction of the normal to the surface of said support board on which said optical element is mounted.

7. The optical module according to claim 1, wherein the layer thickness of said sealing agent is less than the thickness of said optical element, in a direction of a normal to the surface of the support board on which said optical element is mounted.

8. The optical module according to claim 1, wherein
a step is provided in the surface of said support board which contacts with said sealing agent, and
a height of the surface of said sealing agent is substantially equal to the height of said step.

9. An optical transmission module comprising the optical module according to claim 1 comprising an optical element having a light emitting function at one of the end portions of the optical transmission path, and the optical module according to claim 1 comprising an optical element having a light receiving function at the other end portion of the optical transmission path.

10. The optical module according to claim 1, wherein the gap is an air gap, and wherein a surface of the sealing agent facing the air gap is flat.

11. An optical module comprising:
a support board;
an optical transmission path; and
at least a single optical element having a light receiving function or a light emitting function provided on the support board, wherein
a light emission surface of said optical transmission path or a light incidence surface of the optical transmission path is arranged such that said optical element and said optical transmission path are optically coupled to each other, with respect to a light receiving surface or a light emitting surface of said optical element,
said optical element is sealed by a sealing agent, and
a gap is provided between said optical transmission path and the surface of said sealing agent on the light receiving surface or the light emitting surface of said optical element,
wherein a member with higher wettability than that of the supporting member is sandwiched at the interface between said support board and said sealing agent.

12. A method for producing an optical module comprising a support board, an optical transmission path and at least a single optical element having a light receiving function or a light emitting function provided on the support board, the method comprising:
a first step of mounting the optical element on said support board, forming a sealing agent with a predetermined thickness thereon and then curing it, and
a second step of adhering and securing the optical transmission path to the support board,
wherein said optical transmission path comprises an optical-path changeover mirror, a light emission surface of the optical transmission path or a light incidence surface of the optical transmission path is arranged such that said optical element and said optical transmission path are optically coupled to each other, with respect to a light receiving surface or a light emitting surface of said optical element, and
in said second step, the thickness of said sealing agent is set to be a thickness which provides a gap between said optical transmission path and the surface of said sealing agent on the light receiving surface or the light emitting surface of said optical element.

13. The method for producing an optical module according to claim 12, wherein said sealing agent is formed in plural laminated layers and, after a first layer formed is cured, a second layer is laminated thereon.

14. The method for producing an optical module according to claim 12, wherein, after said first step, but before said second step, flattering processing is performed to the surface of said sealing agent on the light receiving surface or the light emitting surface of said optical element.

15. The method for producing an optical module according to claim 12, wherein said sealing agent is cured, in a state where a flat plate is placed on said sealing agent applied on said support board, in said first step.

16. The method for producing an optical module according to claim 15, wherein said sealing agent is cured, in a state where an area which deforms in conformance to the curing contraction of the sealing agent is provided on the portion of the support board which contacts with the sealing agent.

17. The method for producing an optical module according to claim 15, wherein, in said first step, processing for enhancing the wettability is performed to the surface of said support board, before the application of said sealing agent on said support board.

18. The method for producing an optical module according to claim 12, wherein a step is provided on the surface of said support board which contacts with said sealing agent, and in said second step, a thickness of said sealing agent is set to a thickness which causes the height of the surface of said sealing agent to be substantially equal to the height of said step.

19. An electronic apparatus comprising the optical transmission module according to claim 9.

* * * * *